Patented Mar. 24, 1953

2,632,770

UNITED STATES PATENT OFFICE 2,632,770

OXALIC ACID SALT OF A PHENYLENE DIAMINE

Byron A. Hunter, Oxford, Conn., assignor to United States Rubber Company, New York, N. Y., a corporation of New Jersey No Drawing. Original application January 18, 1949, Serial No. 71,550, now Patent No. 2,605,250, dated July 29, 1952. Divided and this application August 24, 1951, Serial No. 243,600

1 Claim. (Cl. 260—501)

This invention relates to new anti-cracking antioxidants for natural and synthetic rubbers.

This application is a division of my application Serial No. 71,550, filed January 18, 1949, and now U. S. Patent No. 2,605,250, issued July 29, 1952.

One of the major rubber chemical problems is the protection of rubber (natural and synthetic) against cracking due to weathering involving either static or dynamic stress while subjected to the influences of air (oxygen; ozone), heat and/or light (sunlight).

An object of this invention is to provide chemicals which will be found highly useful to substantially obviate such cracking tendencies. A further object is to provide a chemical which, besides being a highly effective anti-cracking agent, will be considerably less toxic than other anti-cracking agents. Other objects will be obvious from the hereinafter description.

Such a relatively non-toxic chemical is the mono-oxalic acid salt of N,N'-di-secondary butyl-p-phenylene diamine.

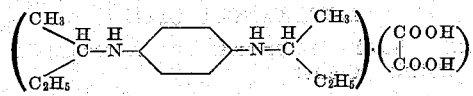

This salt uniquely is less toxic than N,N'-disecondary butyl-p-phenylene diamine which (though effective as an anti-cracking agent) is so toxic as to prohibit its commercial use. In spite of the relative limited dilution with the oxalic acid, the mono salt retains high effectiveness as an anti-cracking agent. The dioxalic acid salt of N,N'-di-secondary butyl-p-phenylene diamine

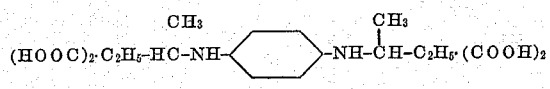

is of no value as an anti-cracking chemical.

The following examples of preparation and testing, are given to illustrate the invention; parts are by weight:

EXAMPLE 1.—PREPARATION OF N,N'-DI-SECONDARY BUTYL-p-PHENYLENE DIAMINE MONO-OXALATE 270 grams (3 moles) of anhydrous oxalic acid are dissolved in 1500 cc. of ethanol (95%) (with slight warming to hasten solution). Into this solution, with stirring, are poured 666 grams (3 moles) of N,N'-di-secondary butyl-p-phenylene diamine. The mixture is kept warm (50° C.) for 30 minutes and is then allowed to stand and cool for about 2 hours. The thick, purple suspension is filtered on a Buchner funnel, spread out on paper sheets and exposed to the air overnight. Yield=767 grams of white crystals (82% of theory). The material melts at 170–171° C. The product was analyzed and found to contain 8.77% nitrogen. The calculated value for

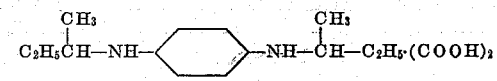

is 9.03% nitrogen.

The same product can also be obtained using water rather than alcohol as the reaction medium.

EXAMPLE 2.—RUBBER TESTS

In order to illustrate the effectiveness of N,N'-di-secondary butyl-p-phenylene diamine monooxalate as an anti-cracking chemical in rubber the following testing data are given:

I. In GR–S (rubbery 1,3-butadiene-styrene-copolymer)

Synthetic rubber compositions were made up in accordance with the following recipe:

|  | Stock A | Stock B |
|---|---|---|
| GR–S | 100.0 | 100.0 |
| Carbon Black | 50.0 | 50.0 |
| Coal Tar Softener | 5.0 | 5.0 |
| Zinc Oxide | 5.0 | 5.0 |
| Sulfur | 2.0 | 2.0 |
| Mercaptobenzothiazole (accelerator) | 1.0 | 1.0 |
| N,N'-di-secondary butyl-p-phenylenediamine mono-oxalate | | 1.5 |

The ingredients were combined on a rubber mill in the ordinary way and portions of each stock were cured at 45 pounds steam pressure for 90 minutes. Samples of the cured stocks (1" x 4") were bent double and the ends fastened together and mounted on a board. The samples were then exposed to outdoor weathering conditions for 3 months. The samples were observed every second day for evidence of cracks. Using an arbitrary scale of visual crack rating, based on a large number of similar tests, stocks A and B were rated as follows:

|  | Days to Develop Slight Cracks | Days to Develop Bad Cracks |
|---|---|---|
| Stock A | 4 | 7 |
| Stock B | 39 | 67 |

EXAMPLE 3

In order to demonstrate the effectiveness of N,N'-di-secondary butyl-p-phenylene diamine mono-oxalate in retarding outdoor dynamic cracking of GR-S, portions of stocks A and B were cured for 90 minutes (1" x 6" Demattia grooved bending samples) and subjected to repeated bending on an outdoor bending machine. The samples were exposed to outdoor weathering conditions for 3 months. The machine was operated for approximately 16 hours per day at the rate of 10.5 kilocycles per day. The samples were observed periodically and rated according to an arbitrary visual rating scale based on observations of a large number of similar tests. The data obtained, as shown below, clearly illustrates the superior properties of the new anti-cracking chemical.

|  | Stock A | Stock B |
|---|---|---|
| Kilocycles flexing to very very slight cracks | 271 | 4,662 |
| Kilocycles flexing to very slight cracks | 456 | 4,760 |
| Kilocycles flexing to slight cracks | 533 | 5,434 |
| Kilocycles flexing to cracks | 738 | 6,731 |

EXAMPLE 4

II. In natural rubber

Natural rubber compounds were made up according to the following recipe:

|  | Stock C | Stock D |
|---|---|---|
| Smoked sheets | 100.0 | 100.0 |
| Carbon black | 45.0 | 45.0 |
| Zinc oxide | 5.0 | 5.0 |
| Zinc soap of coconut oil acids | 3.5 | 3.5 |
| Pine tar | 3.5 | 3.5 |
| Sulfur | 3.0 | 3.0 |
| Mercaptobenzothiazole | 1.0 | 1.0 |
| N,N'-di-secondary butyl-p-phenylene diamine mono-oxalate | -------- | 1.5 |

Portions of stocks C and D were cured at 30 pounds steam pressure for 60 minutes and 1" x 4" test pieces were cut. The test pieces were bent double and the ends fastened together and mounted on a board. The samples were then exposed to outdoor weather. After 2 days stock C had developed very slight cracks and became badly cracked after 6 days. Stock D, however, showed very slight cracks only after 9 days and became badly cracked only after 14 days.

EXAMPLE 5

Portions of stocks C and D were cured at 30 pounds steam pressure for 60 minutes (1" x 6" Demattia grooved bending samples) and the resulting test pieces were repeatedly flexed on an outdoor bending machine as in Example 3. Stock C exhibited bad cracks after 233 kiloycyles of flexing whereas stock D, containing the new anti-cracking chemical, showed a similar degree of cracking after 1207 kilocycles.

The proportions, by weight, of the anti-cracking chemical may vary from 0.1% to 5%, based on the rubber content, although either smaller or greater proportions may be found useful.

It is understood that other desired filling and compounding ingredients may be incorporated along with the anti-cracking chemical. For example, there may be incorporated other accelerators, softeners, etc.

The anti-cracking chemical may be incorporated in any type of rubber composition, such as those used for automobile tires and tubes, hose, belting, sheet and thread rubber, rubberized fabrics, molded goods, boots and shoes, etc., whether vulcanized in a mold, in open steam, in hot air, or in the cold by the so-called acid process. If the material to which the anti-cracking chemical is added is a liquid such as rubber cement or an oil, it may be dissolved therein in a suitable small proportion. The anti-cracking chemical may be incorporated into solid substances by milling or mastication, and prepared for incorporation in dispersions or solutions either in powder, paste, or solution form, or applied in such forms for incorporation by diffusion to the surface of vulcanized or unvulcanized rubber goods.

Having thus described my invention, what I claim and desire to protect by Letters Patent is:

As a new chemical the mono-oxalic acid salt of N,N'-di-secondary butyl-p-phenylene diamine.

BYRON A. HUNTER.

REFERENCES CITED

The following references are of record in the file of this patent:

UNITED STATES PATENTS

| Number | Name | Date |
|---|---|---|
| 1,875,903 | Williams et al. | Sept. 6, 1932 |
| 2,067,686 | Semon | Jan. 12, 1937 |
| 2,279,385 | Brimer | Apr. 14, 1942 |